(12) United States Patent
Pledl et al.

(10) Patent No.: US 12,387,723 B2
(45) Date of Patent: Aug. 12, 2025

(54) APPARATUS FOR OUTPUTTING AN AUDIO SIGNAL IN A VEHICLE CABIN

(71) Applicant: ASK Industries GmbH, Niederwinkling (DE)

(72) Inventors: Jürgen Pledl, Donaustauf (DE); James Rex, Offenberg/Neuhausen (DE)

(73) Assignee: ASK Industries GmbH, Niederwinkling (DE)

( * ) Notice: Subject to any disclaimer, the term of this patent is extended or adjusted under 35 U.S.C. 154(b) by 237 days.

(21) Appl. No.: 17/774,765

(22) PCT Filed: Nov. 7, 2019

(86) PCT No.: PCT/EP2019/080508
§ 371 (c)(1),
(2) Date: May 5, 2022

(87) PCT Pub. No.: WO2021/089148
PCT Pub. Date: Apr. 14, 2021

(65) Prior Publication Data
US 2022/0375470 A1 Nov. 24, 2022

(51) Int. Cl.
*G10L 15/22* (2006.01)
*H04R 3/00* (2006.01)
*G10H 1/36* (2006.01)

(52) U.S. Cl.
CPC .............. *G10L 15/22* (2013.01); *H04R 3/00* (2013.01); *G10H 1/366* (2013.01);
(Continued)

(58) Field of Classification Search
CPC .................... G10H 1/366; G10H 2210/056
See application file for complete search history.

(56) References Cited

U.S. PATENT DOCUMENTS 8,553,906 B2   10/2013   Sim et al.
11,735,191 B2 *  8/2023   Lesso ................. G10L 25/90
                                               704/233

FOREIGN PATENT DOCUMENTS

EP       2018034 A1        1/2009
JP       2000047677 A  *   2/2000
(Continued)

OTHER PUBLICATIONS

International Search Report and Written Opinion dated May 25, 2020, pertaining to Int'l Patent Application No. PCT/EP2019/080508.
(Continued)

*Primary Examiner* — Feng-Tzer Tzeng
(74) *Attorney, Agent, or Firm* — Dinsmore & Shohl LLP

(57) ABSTRACT

Apparatus for outputting an audio signal in a vehicle cabin comprising: at least one audio outputting device configured to output an audio signal comprising at least one audio signal component containing a human voice, particularly a singer's voice, and/or a musical instrument in a vehicle cabin; at least one audio processing device configured to process at least one audio signal output by the at least one audio outputting device so as to suppress the audio signal component in a suppression mode; at least one audio receiving device configured to receive an acoustic human voice signal, of at least one person located in the vehicle cabin whilst the audio outputting device outputs the audio signal in the vehicle cabin; and a control device configured to control operation of the audio processing device based on at least one acoustic human signal received by the audio receiving device.

19 Claims, 1 Drawing Sheet

(52) U.S. Cl.
   CPC .. *G10H 2210/056* (2013.01); *G10L 2015/223* (2013.01); *H04R 2499/13* (2013.01)

(56) References Cited

FOREIGN PATENT DOCUMENTS

| | | | | | |
|---|---|---|---|---|---|
| JP | 2002041068 | A | * | 2/2002 | |
| JP | 2008015211 | A | * | 1/2008 | |
| JP | 2008271067 | A | * | 11/2008 | ............ B60N 2/879 |
| JP | 4916005 | B2 | * | 4/2012 | |
| JP | 2019049599 | A | | 3/2019 | |
| KR | 101840015 | B1 | * | 12/2016 | |
| WO | 2020045398 | A1 | | 3/2020 | |

OTHER PUBLICATIONS

Japanese Office Action dated Jul. 11, 2023, pertaining to JP Patent Application No. 2022-526171, 7 pgs.

* cited by examiner

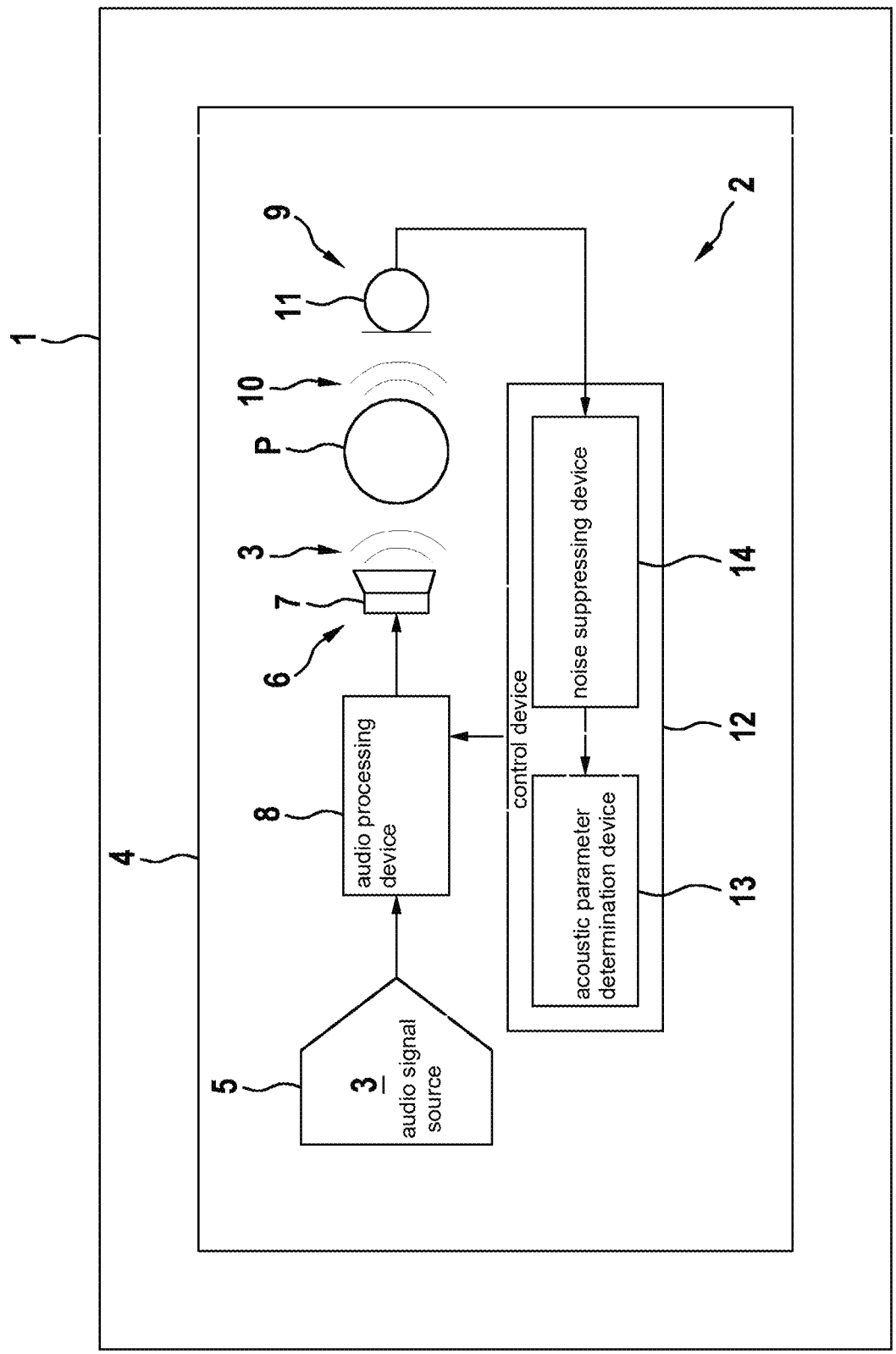

APPARATUS FOR OUTPUTTING AN AUDIO SIGNAL IN A VEHICLE CABIN

CROSS-REFERENCE TO RELATED APPLICATIONS

The present specification is a National Phase Entry of International Application No. PCT/EP2019/080508 filed Nov. 7, 2019 and entitled "APPARATUS FOR OUTPUTTING AN AUDIO SIGNAL IN A VEHICLE CABIN," the entirety of which is incorporated by reference herein.

FIELD

The present specification refers to an apparatus for outputting an audio signal in a vehicle cabin, the apparatus comprising at least one audio outputting device configured to output an audio signal comprising at least one audio signal component containing a human voice, particularly a singer's voice, and/or a musical instrument in a vehicle cabin; and at least one audio processing device configured to process at least one audio signal outputtable by the at least one audio outputting device, the at least one audio signal comprising at least one audio signal component containing a human voice, particularly a singer's voice, and/or a musical instrument, so as to suppress the at least one audio signal component containing a human voice, particularly a singer's voice, and/or a musical instrument in the at least one audio signal in a suppression mode.

BACKGROUND

Apparatuses for outputting an audio signal in a vehicle cabin, which audio signal typically, comprises at least one audio signal component containing a human voice, particularly a singer's voice, and/or a musical instrument in a vehicle cabin, are generally known from prior art.

Respective apparatus are typically, configured to implement a so-called "Karaoke"-mode in which the output of audio signal components containing a human voice, particularly a singer's voice, of an audio signal containing respective audio signal components is temporarily suppressed enabling that a person in the vehicle cabin can sing along or in accompaniment with the respective audio signal.

A drawback of these known apparatuses is that they typically, require manual interaction for controlling, e.g. enabling or disabling, of the suppression of respective audio signal components. A manual interaction can require pulling, pushing, rotating, etc. of manually controllable control elements such as buttons, switches, sliders, etc. The control, i.e. particularly the activation, of respective special operational modes, such as the aforementioned "Karaoke"—mode, of respective apparatuses can thus,— especially for a person who wants to sing (only) at certain times, e.g. during a chorus, whilst a musical piece is output—be deemed as distracting and time-consuming. This is particularly true when the person is a driver in special traffic conditions in which he or she should keep their hands at the steering wheel of the vehicle.

SUMMARY

It is the object of the present specification to provide an apparatus for outputting an audio signal in a vehicle cabin allowing for an improved, i.e. particularly easy and reliable, implementation of special operational modes, such as "Karaoke"-modes, which particularly does not require manual interaction between a person and the apparatus for controlling operation of the apparatus by the person.

This object is achieved by an apparatus for outputting an audio signal in a vehicle cabin according to claim 1. The Claims depending on claim 1 refer to possible embodiments of the apparatus.

A first aspect of the specification refers to an apparatus (hereinafter "the apparatus") for outputting an audio signal, i.e. particularly an audio signal representing a recorded musical piece including vocals and/or musical instruments, such as a recorded musical piece performed by one or more persons singing and/or speaking and/or playing at least one musical instrument, e.g. a pop song, a rock song, a jazz song, a hip-hop song, a classical song, etc., in a vehicle cabin of a vehicle. The apparatus can be implemented as a vehicle audio system or form part of a vehicle audio system. The term "outputting" can generally, be understood as reproducing as sound or playing back an audio signal.

The apparatus is generally, configured to output and/or reproduce an audio signal, i.e. particularly an audio signal representing a musical piece including vocals and/or musical instruments and thus, comprising at least one audio signal component containing a (recorded) human voice, particularly a singer's voice, and/or a (recorded) musical instrument, particularly an acoustic musical instrument and/or an electronic musical instrument, in a vehicle cabin.

A respective audio signal may be provided from any audio signal source. A respective audio signal source can be embodied as or comprise a data carrier device, e.g. from a CD, tape, USB-stick, etc., a radio device, such as a FM radio, network device, such as a network application, a mobile electronic device, such as a smartphone, smartwatch, tablet, notebook, etc. The apparatus may thus, be connectable or connected with at least one audio signal source, e.g. at least one of the aforementioned audio signal sources.

The apparatus comprises at least one audio outputting device configured to output and/or reproduce at least one input audio signal (input audio signal) comprising at least one audio signal component containing a (recorded) human voice, particularly a singer's voice, and/or at least one (recorded) musical instrument, particularly an acoustic musical instrument and/or an electronic musical instrument, in a vehicle cabin. The at least one audio outputting device typically, comprises one or more audio outputting elements, such as loudspeakers. Each audio outputting element may be assigned to a specific location or space, i.e. particularly to a specific seat, in the or a vehicle cabin of a vehicle being equipped with the apparatus. The one or more audio outputting elements are thus, arrangeable or arranged so as to output a respective audio signal in the or a vehicle cabin. As an example, the one or more audio outputting elements may be arrangeable or arranged at and/or in structural elements, e.g. instrument panels, pillars, doors, ceiling, etc., of a vehicle being equipped with the apparatus. Notably, the one or more audio outputting elements and the at least one audio outputting device, respectively can be standard components of a vehicle audio system implemented by the apparatus. Hence, at least from a structural point of view, the at least one audio outputting device of the apparatus can be a standard audio outputting device of a vehicle audio system.

The apparatus further comprises at least one hardware- and/or software-embodied audio processing device configured to process at least one audio signal outputtable by the at least one audio outputting device, the at least one audio signal comprising at least one audio signal component containing a human voice, particularly a singer's voice, and/or a musical instrument, so as to suppress the at least one audio signal component containing a human voice, particularly a singer's voice, and/or a musical instrument in the at least one audio signal in a suppression mode. The at least one audio processing device is thus, operable in at least one suppression mode in which the at least one audio processing device (actively) suppresses at least one audio signal component containing a human voice, particularly a singer's voice, and/or a musical instrument in a respective audio signal.

The at least one audio processing device may thus, (also) be deemed or denoted as a vocal suppressor and/or as a musical instrument suppressor. As such, a respective audio signal can be modified by the at least one audio processing device. Modifying a respective audio signal can particularly, be implemented by suppressing the or at least one audio signal component which contains a human voice, particularly a singer's voice, and/or by suppressing the or at least one audio signal component which contains a musical instrument. As a consequence, a modified audio signal can be an audio signal with suppression of at least one (original) audio signal component containing a human voice, particularly a singer's voice, and/or with suppression of at least one (original) audio signal component containing a musical instrument. In other words, the at least one audio processing device is configured to generate a modified audio signal which differs from an original audio signal by a suppression of at least one audio signal component which contains a human voice, particularly a singer's voice, and/or by a suppression of at least one audio signal component which contains a musical instrument. The at least one audio processing device may be embodied as or comprise one or more suitable hardware- and/or software-embodied filter devices configured to suppress respective audio signal components of an input audio signal.

The at least one audio processing device may be configured to suppress a respective audio signal component containing a human voice, particularly a singer's voice, and/or a respective audio signal component containing a musical instrument with a pre-definable or pre-defined dynamic or static suppression level. Thereby, a suppression level of 0% means no suppression of the respective audio signal component such that the audio signal is output with no suppression of the respective audio signal component and a suppression level of 100% means complete suppression of the audio signal component such that the audio signal is output with complete suppression of the respective audio signal component. In other words, suppression either results in reducing the energy level, i.e. particularly a volume level, of the respective audio signal component by a certain amount or (completely) cancelling the respective audio signal component.

Suppressing at least one respective audio signal component containing a human voice and/or a respective audio signal component containing a musical instrument may require determining the at least one respective audio signal component which is to be suppressed in the (original) audio signal and/or extracting the at least one respective audio signal component which is to be suppressed from the (original) audio signal. The at least one audio processing device may thus, be configured to determine at least one respective audio signal component which is to be suppressed in the audio signal and/or extract at least one respective audio signal component which is to be suppressed from the audio signal, respectively. The determination and/or extraction may be realized by analyzing the acoustic properties, e.g. the frequency spectrum, of the audio signal with regard to (characteristic) acoustic properties, e.g. a specific frequency range, which can be assigned to the audio signal component containing the respective human voice, e.g. the singer's voice, to be suppressed and/or the audio signal component containing the respective musical instrument to be suppressed. Additionally or alternatively, the determination and/or extraction may be realized by analyzing the acoustic properties, e.g. the frequency spectrum, of the audio signal with regard to (characteristic) acoustic properties, e.g. a specific frequency range, which can be distinguished from audio signal components not containing the respective human voice(s) to be suppressed, e.g. containing musical instruments or other human voices, or from audio signal components not containing the respective musical instrument(s) to be suppressed, e.g. containing human voice(s) or other musical instruments.

The at least one audio processing device may particularly, be configured to extract at least one audio signal component containing a human voice, particularly a singer's voice, to be suppressed and/or at least one audio signal component containing a musical instrument to be suppressed from an (original) audio signal which is outputtable or output in the respective vehicle cabin and to separate at least one extracted audio signal component containing a human voice, particularly a singer's voice, to be suppressed and/or at least one extracted audio signal component containing a musical instrument to be suppressed from other audio signal components of the respective audio signal not containing the respective acoustic audio signal component to be suppressed. Once determined and/or extracted in respective manner, the audio signal component to be suppressed may be suppressed as specified above.

The at least one audio processing device may particularly, be configured to extract the respective audio signal component(s) to be suppressed from the audio signal via splitting of the audio signal in a plurality of audio signal components. Thereby, one or more audio signal component(s) obtained via splitting the audio signal in the plurality of audio signal components represent(s) the respective audio signal component(s) to be suppressed. Splitting of the audio signal may comprise analyzing the audio signal with regard to the respective audio signal component(s) which is/are to be split from other audio signal components not to be suppressed. The analysis of the audio signal can be performed on basis of pre-definable or pre-defined acoustic properties, e.g. amplitude and/or frequency, of audio signal components containing to be suppressed and of audio signal components not to be suppressed.

Additionally or alternatively, the at least one audio processing device or a hardware- and/or software-embodied splitting device assignable or assigned to the at least one audio processing device may be configured to split the audio signal in a plurality of audio signal components so as to obtain at least a center signal component, a left signal component, and a right signal component. The center signal component is the or a component of the audio signal which represents the or an audio signal component which is acoustically perceived by a person located at a given position, e.g. the driver's position, inside the vehicle cabin as being output from a center direction and/or center position of the at least one audio outputting device comprising a left audio output channel and a right audio output channel. The left signal component is the or a component of the audio signal which represents an audio signal component which is acoustically perceived by a person located at a given position, e.g. the driver's position, inside the vehicle cabin as being output from a (more) left direction and/or left position with respect to a center direction and/or center position of the at least one audio outputting device comprising a left audio output channel and a right audio output channel. The right signal component is the or a component of the audio signal which represents an audio signal component which is acoustically perceived by a person located at a given position, e.g. the driver's position, inside the vehicle cabin as being output from a (more) right direction and/or right position with respect to a center direction and/or center position of the at least one audio outputting device comprising a left audio output channel and a right audio output channel.

A respective splitting of the audio signal in a respective center signal component, a left signal component, and a right signal component is based on the insight that the center signal component typically, contains the human voice, particularly the singer's voice, and that left signal components and/or right signal components typically, contains musical instruments. Hence, when obtaining the center signal component, one typically also obtains the audio signal component which contains the human voice, particularly the singer's voice, and when obtaining the left signal component and/or the right signal component, one typically also obtains the audio signal component which contains at least one musical instrument. As an example, there are audio signals having harmonic instruments, e.g. guitar, horns, etc., as the left signal component and rhythm instruments, e.g. drums, as the right signal component or vice versa.

A respective splitting of the audio signal in a respective center signal component, a left signal component, and a right signal component typically, applies for a stereo audio signal comprising a left and a right audio signal component.

The apparatus further comprises at least one audio receiving device configured to receive at least one acoustic human signal, e.g. an acoustic human voice signal and/or an acoustic human rhythm signal, of at least one person located in the or a vehicle cabin of the or a vehicle equipped with the apparatus whilst the at least one audio outputting device outputs the or an audio signal in the or a vehicle cabin. The term "person" generally refers to any person in the respective vehicle cabin, such as a driver or co-driver, for instance.

The at least one audio receiving device, thus allows for live or real-time receiving acoustic human signals, i.e. acoustic human voice signals originating from singing, humming, speaking, etc. of at least one person located in the respective vehicle cabin and/or acoustic human rhythm signals originating from one or more percussive action, such as clapping, drumming, snapping, stomping, tapping, beatboxing, etc., of at least one person located in the respective vehicle cabin, in a vehicle cabin during outputting an audio signal in the respective vehicle cabin via the at least one audio outputting device. The receiving of respective acoustic human signals in the vehicle cabin via the at least one audio receiving device may thus, take place simultaneously with outputting an audio signal in the vehicle cabin via the at least one audio outputting device.

The at least one audio receiving device typically, comprises one or more audio receiving elements, such as microphones. Each audio receiving element may be assigned to a specific location or space, i.e. particularly to at least one specific seat, in the or a vehicle cabin of a vehicle being equipped with the apparatus. As an example, the one or more audio receiving elements may be arrangeable or arranged at and/or in structural elements, e.g. instrument panels, pillars, doors, ceiling, etc., of a vehicle being equipped with the apparatus so as to receive an acoustic human signal of at least one person located in the or a vehicle cabin of the or a vehicle equipped with the apparatus whilst the at least one audio outputting device outputs the audio signal in the or a vehicle cabin of the or a vehicle. Notably, the one or more audio receiving elements and the at least one audio receiving device, respectively can be standard components of a vehicle audio system implemented by the apparatus. Hence, at least from a structural point of view, the at least one audio receiving device of the apparatus can be a standard audio receiving device of a vehicle audio system.

This simultaneous outputting of audio signals in the or a vehicle cabin and receiving of acoustic human signals in the respective vehicle cabin may form basis for implementing special operational modes of the apparatus, such as "Karaoke"-modes. As will be more apparent from below, the one or more audio receiving elements may also be arrangeable or arranged so as to receive undesired noise, noise, such as acoustic feedback, acoustically perceivable in the respective vehicle cabin.

The apparatus further comprises at least one hardware- and/or software embodied control device configured to control operation of the audio processing device based on at least one acoustic human signal received by the at least one audio receiving device. The at least one control device thus, enables controlling operation of the audio processing device, e.g. enabling or disabling, in context with implementing respective special operational modes, such as "Karaoke"-modes, of the apparatus, without manual interaction between a person and the apparatus, but based on at least one acoustic human signal received by the at least one audio receiving device.

The at least one control device thus, enables acoustically controlling operation of the at least one audio processing device, e.g. enabling or disabling, in context with implementing respective special operational modes, such as "Karaoke"-modes, of the apparatus based on at least one acoustic human signal received by the at least one audio receiving device. Thus, the at least one control device specifically simplifies controlling respective special operational modes of the apparatus, in which suppression of at least one audio signal component containing a human voice and/or at least one audio signal component containing a musical instrument is required, because the activation, modification, or deactivation of a respective suppression can be triggered by at least one acoustic human signal received by the at least one audio receiving device. As such, a more spontaneous and intermittent activation, modification, or deactivation of respective special operational modes, in which suppression of at least one audio signal component containing a human voice and/or at least one audio signal component containing a musical instrument is required, is feasible.

This particularly, allows for an automatable or automated control of respective special operational modes of the apparatus.

Hence, an improved apparatus for outputting an audio signal in a vehicle cabin allowing is given which allows for an easy and reliable implementation of special operational modes, such as "Karaoke"-modes, which particularly does not require manual interaction between a person and the apparatus for controlling operation of the apparatus by a person located in a respective vehicle cabin.

As indicated above, the at least one control device specifically simplifies controlling respective special operational modes of the apparatus in which suppression of at least one audio signal component containing a human voice and/or at least one audio signal component containing a musical instrument is required because the activation, modification, or deactivation of a respective suppression can be triggered by at least one acoustic human signal received by the at least one audio receiving device. The at least one control device may thus, be particularly configured to generate at least one control signal, particularly an enabling control command, enabling the suppression mode of the at least one audio processing device based on the at least one received acoustic human signal. Additionally or alternatively, the at least one control device may be configured to generate a control signal, particularly a disabling control command, disabling the suppression mode of the at least one audio processing device based on the at least one received acoustic human signal. Additionally or alternatively, the at least one control device may be configured to generate a control signal, particularly a modification control command, modifying the suppression mode of the at least one audio processing device based on the at least one received acoustic human signal.

The at least one control device may be configured to process the at least one received acoustic human signal so as to determine if the or at least one person located in the respective vehicle cabin performs, particularly sings, along or in accompaniment with an audio signal component containing a human voice, particularly a singer's voice, while the audio signal comprising the respective audio signal component is output in the respective vehicle cabin and/or if the or at least one person located in the or a vehicle cabin performs, e.g. drums, taps, etc., along or in accompaniment with an audio signal component containing a musical instrument which is output in the respective vehicle cabin while the audio signal comprising the respective audio signal component is output in the respective vehicle cabin. The at least one control device may thus, be configured to determine if the or a received acoustic human signal is indicative that the at least one person located in the respective vehicle cabin performs along or in accompaniment with an audio signal comprising at least one audio signal component containing a human voice, particularly a singer's voice, and/or a musical instrument. The determination may be based on determining one or more parameters, particularly acoustic parameters, such as pitch or rhythm, of a received acoustic human signal and comparing it with reference parameters allowing for a determination if the respective acoustic human signal is indicative that the or at least one person located in the respective vehicle cabin performs along or in accompaniment with an audio signal or a respective audio signal component containing a human voice, particularly a singer's voice, and/or a respective audio signal component containing a musical instrument.

Respective reference parameters can be corresponding parameters of the audio signal and specifically, the respective audio signal component which is to be suppressed or is suppressed by the at least one audio processing device. As an example, the at least one control device may be configured to determine if e.g. pitch- and/or rhythm-parameters of a received acoustic human signal match corresponding pitch- and/or rhythm-parameters of an audio signal or a respective audio signal component containing a human voice, particularly a singer's voice, and/or a respective audio signal component containing a musical instrument which is output in the respective vehicle cabin. If a general match between pitch- and/or rhythm-parameters of a received acoustic human signal and corresponding pitch- and/or rhythm-parameters of an audio signal or a respective audio signal component containing a human voice, particularly a singer's voice, and/or a respective audio signal component containing a musical instrument which is output in the respective vehicle cabin is determined, the at least one control device may be configured to qualitatively and/or quantitatively determine the degree of matching between pitch- and/or rhythm-parameters of a received acoustic human signal and corresponding pitch- and/or rhythm-parameters of an audio signal or a respective audio signal component containing a human voice, particularly a singer's voice, and/or a respective audio signal component containing a musical instrument which is output in the respective vehicle cabin.

The at least one control device may be configured to process the or at least one received acoustic human signal so as to determine if the or at least one person located in the or a vehicle cabin (acoustically) articulates an acoustic suppression mode controlling information, particularly an acoustic suppression mode enabling information, more particularly an acoustic suppression mode enabling command, or an acoustic suppression mode disabling information, more particularly an acoustic suppression mode disabling command, or an acoustic suppression mode modifying information, more particularly an acoustic suppression mode modifying command.

A respective acoustic suppression mode controlling information can be or comprise a vocal articulation of the or at least one person in the respective vehicle cabin such as "enable suppression" or similar, "disable suppression" or similar, "increase suppression" or similar, or "decrease suppression" or similar. Likewise, a respective acoustic suppression mode controlling information can be or comprise a more specified vocal articulation such as "enable vocal suppression" or similar, "enable instrument suppression" or similar, "disable vocal suppression" or similar, "disable instrument suppression" or similar, "increase vocal suppression" or similar, "increase instrument suppression" or similar, "decrease vocal suppression" or similar, "decrease instrument suppression" or similar. Of course, a respective person can also specify at least one specific vocal or at least one specific instrument whose suppression is to be enabled, disabled, or modified, respectively; a respective acoustic suppression mode controlling information can be or comprise a vocal articulation such as "enable main singer suppression" or similar, "enable drums suppression" or similar, "disable main singer suppression" or similar, "disable drums suppression", "increase main singer suppression" or similar, "increase drums suppression" or similar, "decrease main singer suppression" or similar, or "decrease drums suppression" or similar.

A respective acoustic suppression mode controlling information can additionally or alternatively be or comprise a rhythmic articulation of at least one person in the respective vehicle cabin such as a clap, a snap, a stomp, etc. Merely as an example, a clap, snap, stomp, etc. or a specific rhythmic sequence of claps, snaps, stomps could be related with a specific acoustic compression mode controlling information.

Likewise, other acoustic compression mode controlling information based on other acoustic articulations of at least one person in the respective vehicle cabin are conceivable. Merely as an example, a whistle or a specific harmonic and/or rhythmic sequence of whistles could be related with a specific acoustic compression mode controlling information.

As is apparent from above, the at least one control device may be generally configured to process at least one respective received acoustic human signal so as to determine at least one acoustic parameter of the at least one respective received acoustic human signal, whereby the at least one control device may be configured to control operation, particularly the suppression level, of the at least one audio processing device based on the at least one determined acoustic parameter of the at least one respective received acoustic human signal.

The at least one control device may be configured to statically or dynamically control operation of the at least one audio processing device, particularly in the suppression mode. A static control of operation of the at least one audio processing device, e.g. by a static suppression level, typically, results in reduced consumption of processing capacity, whereas a dynamic control of operation of the at least one audio processing device, e.g. by a dynamic suppression level, may lead to an enhanced user-experience such that both variants have specific advantages.

The at least one control device or an acoustic parameter determination device assignable or assigned to the at least one control device may be configured to process the at least one received acoustic human signal so as to determine at least one dynamic acoustic parameter, e.g. loudness, of the at least one received acoustic human signal, whereby the at least one control device may be configured to dynamically control operation of the at least one audio processing device based on the at least one determined dynamic acoustic parameter of the at least one received acoustic human signal. As such the at least one control device may be configured to process the at least one received acoustic human signal so as to determine the loudness of the at least one received acoustic human signal. Based on the determination of the loudness of the at least one received acoustic human signal, the at least one control device may control operation of the at least one audio processing device so as to adjust and/or vary the suppression level. Hence, a relation between the loudness of the at least one received acoustic human signal and the suppression level can be implemented. As an example, a high loudness—loudness threshold levels may be applied—of at least one received acoustic human signal may be related with a low suppression level of the respective acoustic signal component to be suppressed, and a low loudness—loudness threshold levels may be applied—of at least one received acoustic human signal may be related with a high suppression level of the respective acoustic signal component to be suppressed or vice versa.

More specifically, the at least one control device may be configured to dynamically control operation of the at least one audio processing device based on the at least one determined dynamic acoustic parameter of the at least one received acoustic human signal by dynamically increasing or decreasing a suppression level applicable or applied to the respective audio signal component containing a human voice, particularly a singer's voice, and/or a musical instrument which is to be suppressed, particularly in accordance with a dynamically increasing or decreasing acoustic parameter level, e.g. loudness level, of the at least one received acoustic human signal. As such, the suppression level may be dynamically adjusted and/or varied based on at least one dynamically changing acoustic parameter, e.g. loudness, of the at least one received acoustic human signal.

A respective dynamic acoustic parameter of the at least one received acoustic human signal can be loudness and/or pitch and/or rhythm. This applies both to acoustic vocal signals generated by a person located in the respective vehicle cabin and to acoustic rhythm signals generated by a person located in the respective vehicle cabin.

The at least one audio receiving device may be configured to receive the at least one acoustic human signal for a defined period of time, e.g. a period of 1-5 sec, whereby the at least one control device may be configured to process the at least one received acoustic human signal so as to generate an average value of at least one acoustic parameter, e.g. loudness, of the at least one received acoustic human signal for the respective period of time. Generating a respective average value may result in reduced consumption of processing capacity and may also lead to an enhanced user-experience due to a balanced control of the suppression level. The period of time is typically selected such that it is short enough that the at least one control device can react quickly enough when at least one acoustic human signal is received.

The at least one control device or a noise suppressing device assignable or assigned with the at least one control device may be configured to suppress received undesired noise signals present in the respective vehicle cabin. As such, undesired noise signals present in the respective vehicle cabin, particularly acoustic feedback generated by receiving the audio signal which is outputtable or output in the respective vehicle cabin via the at least one audio outputting device or noise generated from external noise sources, i.e. particularly noise sources outside the respective vehicle cabin, can be suppressed. The suppression of the undesired noise signals can be performed with dynamic or static suppression levels ranging from 100% (complete suppression) to 0% (no suppression). Suppressing the undesired noise signals may require separating the acoustic human signals from the undesired noise signals or vice versa. In this regard, the above annotations regarding the determination and/or extraction of specific audio signal components from an audio signal apply in analogous manner. The at least one control device or a noise suppressing device assignable or assigned with the at least one control device may be embodied as or comprise one or more suitable hardware- and/or software-embodied filter devices configured to suppress respective received undesired noise signals present in the respective vehicle cabin.

The at least one audio receiving device may generally be built as or comprise at least one static audio receiving element and/or at least one mobile audio receiving element. A respective mobile audio receiving element may be embodied as a mobile, particularly hand-held, microphone. A mobile microphone can be embodied as a wired microphone or a wireless microphone.

At least one mobile audio receiving element may be assignable or assigned to at least one person's seat in the respective vehicle cabin. Hence, the apparatus may distinguish received acoustic human signals based on the assignment of the respective audio receiving elements to the respective person's seat in the or a vehicle cabin.

It is also conceivable case that the at least one audio receiving device comprises a plurality of mobile, particularly hand-held, audio receiving elements, whereby the receiving level of the respective mobile audio receiving elements is individually adjustable or adjusted. As such, signals representing at least one main voice and signals representing at least one subsidiary voice can be implemented, for instance.

It is also conceivable that at least one audio receiving element provided with a mobile electronic device, e.g. a smartphone, a smartwatch, a tablet, a notebook, etc., of at least one person located in the respective vehicle cabin can be used as a mobile audio receiving element. In this case, a respective mobile terminal needs to be connected with the apparatus which can be achieved by a wired or wireless connection. As an example, Bluetooth-, NFC- or WIFI-connections could be established in the respective vehicle cabin.

A second aspect of the specification refers to a hardware- and/or software-embodied control device for an apparatus for outputting an audio signal in a vehicle cabin, the control device being configured to control operation of an audio processing device configured to process at least one audio signal outputtable by at least one audio outputting device, the at least one audio signal comprising at least one audio signal component containing a human voice, particularly a singer's voice, and/or a musical instrument, so as to suppress the at least one audio signal component containing a human voice, particularly a singer's voice, and/or a musical instrument in the at least one audio signal in a suppression mode based on at least one acoustic human signal received by at least one audio receiving device.

All annotations regarding the apparatus of the first aspect of the specification apply mutatis mutandis to the control device of the second aspect of the specification.

A third aspect of the specification refers to a vehicle, particularly a passenger vehicle, such as a car, a truck, a van, etc., comprising a vehicle cabin and an apparatus according to the first aspect of the specification. The apparatus is configured to output an audio signal in the or a vehicle cabin of the vehicle.

All annotations regarding the apparatus of the first aspect of the specification apply mutatis mutandis to the vehicle of the third aspect of the specification.

A fourth aspect of the specification refers to a method for outputting and/or reproducing an audio signal in a vehicle cabin. The method comprises the steps of:
- outputting, particularly via at least one audio outputting device, an audio signal comprising at least one audio signal component containing a human voice, particularly a singer's voice, and/or a musical instrument, in a vehicle cabin;
- receiving, particularly via at least one audio receiving device, at least one acoustic human signal, particularly an acoustic human voice signal, of at least one person located in the or a vehicle cabin whilst outputting the audio signal in the vehicle cabin;
- controlling, particularly via at least one control device, operation of at least one audio processing device configured to process the at least audio signal comprising at least one audio signal component containing a human voice, particularly a singer's voice, and/or a musical instrument outputtable or output in the vehicle cabin, so as to suppress the or at least one audio signal component containing a human voice, particularly a singer's voice, and/or a musical instrument of the at least one audio signal in a suppression mode based on the at least one received acoustic human signal.

All annotations regarding the apparatus of the first aspect of the specification apply mutatis mutandis to the method of the fourth aspect of the specification.

BRIEF DESCRIPTION OF THE DRAWINGS

Exemplary embodiments of the specification are described with reference to the Fig., whereby the sole Fig. shows a principle drawing of a vehicle comprising an apparatus according to an exemplary embodiment.

DETAILED DESCRIPTION

The sole Fig. shows a principle drawing of a vehicle 1 comprising an apparatus 2 according to an exemplary embodiment.

The apparatus 2 is configured to output and/or reproduce a recorded audio signal 3, i.e. particularly an audio signal representing a recorded musical piece including vocals and/or musical instruments and thus, comprising at least one audio signal component containing a (recorded) human voice, particularly a singer's voice, and/or a (recorded) musical instrument, particularly an acoustic musical instrument and/or an electronic musical instrument, in the vehicle cabin 4 of the vehicle 1.

A respective audio signal 3 may be provided from at least one audio signal source 5. A respective audio signal source 5 can be embodied as or comprise a data carrier device, e.g. from a CD, tape, USB-stick, etc., a radio device, such as a FM radio, network device, such as a network application, a mobile electronic device, such as a smartphone, smartwatch, tablet, notebook, etc. The apparatus 2 is thus, connectable or connected with an audio signal source 5, e.g. at least one of the aforementioned examples of audio signal sources.

The apparatus 2 comprises an audio outputting device 6 configured to output and/or reproduce an audio signal 3 comprising at least one audio signal component containing a (recorded) human voice, particularly a singer's voice, and/or at least one (recorded) musical instrument in a vehicle cabin. The audio outputting device 6 typically, comprises one or more audio outputting elements 7, such as loudspeakers. Each audio outputting element 7 may be assigned to a specific location or space, i.e. particularly to a specific seat, in the vehicle cabin 4. The one or more audio outputting elements 7 are thus, arrangeable or arranged so as to output a respective audio signal 3 in the vehicle cabin 4. As an example, the one or more audio outputting elements 7 may be arrangeable or arranged at and/or in structural elements, e.g. instrument panels, pillars, doors, ceiling, etc., of the vehicle 1. Notably, the one or more audio outputting elements 7 and the audio outputting device 6, respectively can be standard components of a vehicle audio system implemented by the apparatus 2. Hence, at least from a structural point of view, the audio outputting device 6 of the apparatus 2 can be a standard audio outputting device of a vehicle audio system.

The apparatus 2 further comprises a hardware- and/or software-embodied audio processing device 8 configured to process a respective audio signal 3 comprising at least one audio signal component containing a human voice, particularly a singer's voice, and/or a musical instrument outputtable by the audio outputting device 6 so as to suppress the at least one respective audio signal component containing a human voice, particularly a singer's voice, and/or a musical instrument in the audio signal 3 in a suppression mode. The audio processing device 8 is thus, operable in at least one suppression mode in which the audio processing device 8 (actively) suppresses at least one respective audio signal component containing a human voice, particularly a singer's voice, and/or a musical instrument in a respective audio signal 3.

The audio processing device 8 may thus, (also) be deemed or denoted as a vocal suppressor and/or as a musical instrument suppressor. As such, a respective audio signal 3 can be modified by the audio processing device 8. Modifying a respective audio signal 3 can particularly, be implemented by suppressing the or at least one audio signal component which contains a human voice, particularly a singer's voice, and/or by suppressing the or at least one audio signal component which contains a musical instrument. As a consequence, a modified audio signal can be an audio signal 3 with suppression of at least one (original) audio signal component containing a human voice and/or with suppression of at least one (original) audio signal component containing a musical instrument. In other words, the audio processing device 8 is configured to generate a modified audio signal which differs from an original audio signal by a suppression of at least one audio signal component which contains a human voice and/or by a suppression of at least one audio signal component which contains a musical instrument. The audio processing device 8 may be embodied as or comprise one or more suitable hardware- and/or software-embodied filter devices configured to suppress respective audio signal components of an input audio signal 3.

The audio processing device 8 may be configured to suppress a respective audio signal component containing a human voice and/or a respective audio signal component containing a musical instrument with a pre-definable or pre-defined dynamic or static suppression level. Thereby, a suppression level of 0% means no suppression of the respective audio signal component such that the audio signal 3 is output with no suppression of the respective audio signal component and a suppression level of 100% means complete suppression of the audio signal component such that the audio signal 3 is output with complete suppression of the respective audio signal component. In other words, suppression either results in reducing the energy level, i.e. particularly a volume level, of the respective audio signal component by a certain amount or completely cancelling the respective audio signal component.

Suppressing the respective audio signal component(s) may require determining the respective audio signal component(s) which is/are to be suppressed in the (original) audio signal 3 and/or extracting the respective audio signal component(s) which is/are to be suppressed from the (original) audio signal 3. The audio processing device 8 may thus, be configured to determine at least one respective audio signal component which is to be suppressed in the audio signal 3 and/or extract at least one respective audio signal component which is to be suppressed from the audio signal 3, respectively. The determination and/or extraction may be realized by analyzing the acoustic properties, e.g. the frequency spectrum, of the audio signal 3 with regard to (characteristic) acoustic properties, e.g. a specific frequency range, which can be assigned to the audio signal component containing the respective human voice to be suppressed and/or the audio signal component containing the respective musical instrument to be suppressed. Additionally or alternatively, the determination and/or extraction may be realized by analyzing the acoustic properties, e.g. the frequency spectrum, of the audio signal 3 with regard to (characteristic) acoustic properties, e.g. a specific frequency range, which can be distinguished from audio signal components not containing the respective human voice(s) to be suppressed, e.g. containing musical instruments or other human voices, or from audio signal components not containing the respective musical instrument(s) to be suppressed, e.g. containing human voice(s) or other musical instruments.

The audio processing device 8 may particularly, be configured to extract respective audio signal component(s) containing a human voice to be suppressed and/or respective audio signal component(s) containing a musical instrument to be suppressed from an (original) audio signal 3 which is outputtable or output in the vehicle cabin 4 and to separate at least one extracted audio signal component containing a human voice to be suppressed and/or at least one extracted audio signal component containing a musical instrument to be suppressed from other audio signal components of the respective audio signal 3 not containing the respective acoustic audio signal component(s) to be suppressed. Once determined and/or extracted in respective manner, the audio signal component to be suppressed may be suppressed as specified above.

The audio processing device 8 may particularly, be configured to extract the respective audio signal component(s) to be suppressed from the audio signal 3 via splitting of the audio signal 3 in a plurality of audio signal components. Thereby, one or more audio signal component(s) obtained via splitting of the audio signal 3 in the plurality of audio signal components represent(s) the respective audio signal component(s) to be suppressed. Splitting of the audio signal 3 may comprise analyzing the audio signal 3 with regard to the respective audio signal component(s) which is/are to be split from other audio signal components not to be suppressed. The analysis of the audio signal 3 can be performed on basis of pre-definable or pre-defined acoustic properties, e.g. amplitude and/or frequency, of audio signal components containing to be suppressed and of audio signal components not to be suppressed.

The audio processing device 8 or a hardware- and/or software-embodied splitting device (not explicitly shown) assignable or assigned to the audio processing device 8 may thus, be configured to split the audio signal 3 in a plurality of audio signal components so as to obtain at least a center signal component, a left signal component, and a right signal component. The center signal component is the or a component of the audio signal 3 which represents the or an audio signal component which is acoustically perceived by a person P located at a given position, e.g. the driver's position, inside the vehicle cabin 4 as being output from a center direction and/or center position of the audio outputting device 6 comprising a left audio output channel and a right audio output channel. The left signal component is the or a component of the audio signal 3 which represents an audio signal component which is acoustically perceived by a person P located at a given position, e.g. the driver's position, inside the vehicle cabin 4 as being output from a (more) left direction and/or left position with respect to a center direction and/or center position of the audio outputting device 6 comprising a left audio output channel and a right audio output channel. The right signal component is the or a component of the audio signal 3 which represents an audio signal component which is acoustically perceived by a person P located at a given position, e.g. the driver's position, inside the vehicle cabin 4 as being output from a (more) right direction and/or right position with respect to a center direction and/or center position of the audio outputting device 6 comprising a left audio output channel and a right audio output channel.

A respective splitting of the audio signal 3 in a respective center signal component, a left signal component, and a right signal component is based on the insight that the center signal component typically, contains the human voice, particularly the singer's voice, and that left signal components and/or right signal components typically, contains musical instruments. Hence, when obtaining the center signal component, one typically also obtains the audio signal component which contains the human voice, particularly the singer's voice, and when obtaining the left signal component and/or the right signal component, one typically also obtains the audio signal component which contains at least one musical instrument. As an example, there are audio signals having harmonic instruments, e.g. guitar, horns, etc., as the left signal component and rhythm instruments, e.g. drums, as the right signal component or vice versa.

A respective splitting up of the audio signal 3 in a respective center signal component, a left signal component, and a right signal component typically, applies for a stereo audio signal comprising a left and a right audio signal component.

The apparatus 2 further comprises an audio receiving device 9 configured to receive at least one acoustic human signal 10, e.g. an acoustic human voice signal and/or an acoustic human rhythm signal, of at least one person P located in the vehicle cabin 4 whilst the audio outputting device 6 outputs the or an audio signal 3 in the vehicle cabin 4. The term "person" generally refers to any person in the respective vehicle cabin 4, such as a driver or co-driver, for instance.

The audio receiving device 9, thus allows for live receiving acoustic human signals 10, i.e. acoustic human voice signals originating from e.g. singing, humming, speaking, etc. of at least one person P located in the vehicle cabin 4 and/or acoustic human rhythm signals originating from percussive action, such as clapping, drumming, stomping, tapping, beat-boxing, etc., of at least one person P located in the vehicle cabin 4, in the vehicle cabin 4 during outputting an audio signal 3 in the vehicle cabin 4 via the audio outputting device 6. The receiving of respective acoustic human signals 10 in the vehicle cabin 4 via the audio receiving device 9 may thus, take place simultaneously with outputting an audio signal 3 in the vehicle cabin 4 via the audio outputting device 6.

The audio receiving device 9 comprises one or more audio receiving elements 11, such as microphones. Each audio receiving element 11 may be assigned to a specific location or space, i.e. particularly to at least one specific seat, in the vehicle cabin 4. As an example, the one or more audio receiving elements 11 may be arrangeable or arranged at and/or in structural elements, e.g. instrument panels, pillars, doors, ceiling, etc., of the vehicle 1 so as to receive an acoustic human signal 10 of at least one person P located in the vehicle cabin 4 whilst the audio outputting device 6 outputs the audio signal 3 in the vehicle cabin 4. Notably, the one or more audio receiving elements 11 and the audio receiving device 9, respectively can be standard components of a vehicle audio system implemented by the apparatus 2. Hence, at least from a structural point of view, the audio receiving device 9 of the apparatus 2 can be a standard audio receiving device of a vehicle audio system.

This simultaneous outputting of audio signals 3 in the vehicle cabin 4 and receiving of acoustic human signals 10 in the vehicle cabin 4 may form basis for implementing special operational modes of the apparatus 2, such as "Karaoke"-modes. As will be more apparent from below, the one or more audio receiving elements 11 may also be arrangeable or arranged so as to receive undesired noise, such as acoustic feedback, acoustically perceivable in the vehicle cabin 4.

The apparatus 2 further comprises at least one hardware- and/or software embodied control device 12 configured to control operation of the audio processing device 8 based on at least one acoustic human signal 10 received by the audio receiving device 9. The control device 12 thus, enables controlling operation of the audio processing device 8, e.g. enabling or disabling, in context with implementing respective special operational modes, such as "Karaoke"-modes, of the apparatus 2, without manual interaction between a person P and the apparatus 2, but based on at least one acoustic human signal 10 received by the audio receiving device 9.

The control device 12 thus, particularly enables acoustically controlling operation of the audio processing device 8 in context with implementing respective special operational modes, such as "Karaoke"-modes, of the apparatus 2 based on at least one acoustic human signal 10 received by the audio receiving device 9. Thus, the control device 12 specifically simplifies controlling respective special operational modes of the apparatus 2 in which suppression of at least one audio signal component containing a human voice and/or at least one audio signal component containing a musical instrument is required because the activation, modification, or deactivation of a respective suppression can be triggered by at least one acoustic human signal 10 received by the audio receiving device 9. As such, a more spontaneous and intermittent activation, modification, or deactivation of respective special operational modes, in which suppression of at least one audio signal component containing a human voice and/or at least one audio signal component containing a musical instrument is required, is feasible.

This particularly, allows for an automatable or automated control of respective special operational modes of the apparatus 2.

As indicated above, the control device 12 specifically simplifies controlling respective special operational modes of the apparatus 2, in which suppression of at least one audio signal component containing a human voice and/or at least one audio signal component containing a musical instrument is required, because the activation, modification, or deactivation of a respective suppression can be triggered by at least one acoustic human signal 10 received by the audio receiving device 9. The control device 12 is thus, particularly configured to generate a control signal, particularly an enabling control command, enabling the suppression mode of the audio processing device 8 based on the at least one received acoustic human signal 10. Additionally or alternatively, the control device 12 is configured to generate a control signal, particularly a disabling control command, disabling the suppression mode of the audio processing device 8 based on the at least one received acoustic human signal 10. Additionally or alternatively, the control device 12 is configured to generate a control signal, particularly a modification control command, modifying the suppression mode of the audio processing device 8 based on the at least one received acoustic human signal 10.

The control device 12 may be configured to process at least one received acoustic human signal 10 so as to determine if the at least one person P located in the vehicle cabin 4 performs, particularly sings, along or in accompaniment with an audio signal component containing a human voice, particularly a singer's voice, while the audio signal 3 comprising the respective audio signal component is output in the vehicle cabin 4 and/or if the at least one person P located in the vehicle cabin 4 performs, e.g. drums, taps, etc., along or in accompaniment with an audio signal component containing a musical instrument which is output in the vehicle cabin 4 while the audio signal 3 comprising the respective audio signal component is output in the vehicle cabin 4. The control device 12 may thus, be configured to determine if a received acoustic human signal 10 is indicative that the or at least one person P located in the vehicle cabin 4 performs along or in accompaniment with an audio signal 3 comprising at least one audio signal component containing a human voice, particularly a singer's voice, and/or a musical instrument. The determination may be based on determining one or more parameters, particularly acoustic parameters, such as pitch or rhythm, of a received acoustic human signal 10 and comparing it with reference parameters allowing for a determination if the respective acoustic human signal 10 is indicative that the or at least one person P located in the vehicle cabin 4 performs along or in accompaniment with an audio signal or a respective audio signal component containing a human voice, particularly a singer's voice, and/or a respective audio signal component containing a musical instrument.

Respective reference parameters can be corresponding parameters of the audio signal 3 and specifically, the audio signal component which is to be suppressed or is suppressed by the audio processing device 8. As an example, the control device 12 may be configured to determine if e.g. pitch- and/or rhythm-parameters of a received acoustic human signal 10 match corresponding pitch- and/or rhythm-parameters of an audio signal 3 or a respective audio signal component containing a human voice and/or a respective audio signal component containing a musical instrument which is output in the vehicle cabin 4. If a general match between pitch- and/or rhythm-parameters of a received acoustic human signal 10 and corresponding pitch- and/or rhythm-parameters of an audio signal 3 or a respective audio signal component containing a human voice and/or a respective audio signal component containing a musical instrument which is output in the vehicle cabin 4 is determined, the control device 12 may be configured to qualitatively and/or quantitatively determine the degree of matching between respective pitch- and/or rhythm-parameters of a received acoustic human signal 10 and corresponding pitch- and/or rhythm-parameters of an audio signal 3 or a respective audio signal component containing a human voice and/or a respective audio signal component containing a musical instrument which is output in the vehicle cabin 4.

The control device 12 may be configured to process a respective received acoustic human signal 10 so as to determine if the or at least one person P located in the vehicle cabin 4 (acoustically) articulates an acoustic suppression mode controlling information, particularly an acoustic suppression mode enabling information, more particularly an acoustic suppression mode enabling command, or an acoustic suppression mode disabling information, more particularly an acoustic suppression mode disabling command, or an acoustic suppression mode modifying information, more particularly an acoustic suppression mode modifying command.

A respective acoustic suppression mode controlling information can be or comprise a vocal articulation of at least one person P in the vehicle cabin 4 such as "enable suppression" or similar, "disable suppression" or similar, "increase suppression" or similar, or "decrease suppression" or similar. Likewise, a respective acoustic suppression mode controlling information can be or comprise a more specified vocal articulation such as "enable vocal suppression" or similar, "enable instrument suppression" or similar, "disable vocal suppression" or similar, "disable instrument suppression" or similar, "increase vocal suppression" or similar, "increase instrument suppression" or similar, "decrease vocal suppression" or similar, "decrease instrument suppression" or similar. Of course, a respective person P can also specify at least one specific vocal or at least one specific instrument whose suppression is to be enabled, disabled, or modified, respectively; a respective acoustic suppression mode controlling information can be or comprise a vocal articulation such as "enable main singer suppression" or similar, "enable drums suppression" or similar, "disable main singer suppression" or similar, "disable drums suppression", "increase main singer suppression" or similar, "increase drums suppression" or similar, "decrease main singer suppression" or similar, or "decrease drums suppression" or similar.

A respective acoustic suppression mode controlling information can additionally or alternatively be or comprise a rhythmic articulation of a person P in the vehicle cabin 4 such as a clap, a snap, a stomp, etc. Merely as an example, a clap, snap, stomp, etc. or a specific rhythmic sequence of claps, snaps, stomps could be related with a specific acoustic compression mode controlling information.

Likewise, other acoustic compression mode controlling information based on other acoustic articulations of a person P in the vehicle cabin 4 are conceivable. Merely as an example, a whistle or a specific harmonic and/or rhythmic sequence of whistles could be related with a specific acoustic compression mode controlling information.

As is apparent from above, the control device 12 may be generally configured to process at least one respective received acoustic human signal 10 so as to determine at least one acoustic parameter of the at least one respective received acoustic human signal 10, whereby the control device 12 may be configured to control operation, particularly the suppression level, of the audio processing device 8 based on the at least one determined acoustic parameter of the at least one respective received acoustic human signal 10.

The control device 12 may be configured to statically or dynamically control operation of the audio processing device 8, particularly in the suppression mode.

The control device 12 or an acoustic parameter determination device 13 (optional) assignable or assigned to the control device 12 may be configured to process at least one respective received acoustic human signal 10 so as to determine at least one dynamic acoustic parameter, e.g. loudness, of the respective received acoustic human signal 10, whereby the control device 12 may be configured to dynamically control operation of the audio processing device 8 based on the at least one determined dynamic acoustic parameter of the at least one respective received acoustic human signal 10. As such, the control device 12 may be configured to process the at least one respective received acoustic human signal 10 so as to determine the loudness of the at least one respective received acoustic human signal 10. Based on the determination of the loudness of the of the at least one respective received acoustic human signal 10, the control device 12 may control operation of the audio processing device 8 so as to adjust and/or vary the suppression level. Hence, a relation between the loudness of the at least one respective received acoustic human signal 10 and the suppression level can be implemented. As an example, a high loudness—loudness threshold levels may be applied—of at least one respective received acoustic human signal 10 may be related with a low suppression level of the respective acoustic signal component to be suppressed, and a low loudness—loudness threshold levels may be applied—of at least one received acoustic human signal 10 may be related with a high suppression level of the respective acoustic signal component to be suppressed or vice versa.

More specifically, the control device 12 may be configured to dynamically control operation of the audio processing device 8 based on the at least one determined dynamic acoustic parameter of at least one respective received acoustic human signal 10 by dynamically increasing or decreasing a suppression level applicable or applied to the respective audio signal component containing a human voice and/or a musical instrument which is to be suppressed, particularly in accordance with a dynamically increasing or decreasing acoustic parameter level, e.g. loudness level, of the at least one respective received acoustic human signal 10. As such, the suppression level may be dynamically adjusted and/or varied based on at least one dynamically changing acoustic parameter, e.g. loudness, of the at least one received acoustic human signal 10.

A respective dynamic acoustic parameter of at least one respective received acoustic human signal 10 can be loudness and/or pitch and/or rhythm. This applies both to acoustic vocal signals generated by a person P located in the vehicle cabin 4 and to acoustic rhythm signals generated by a person P located in the vehicle cabin 4.

The audio receiving device 9 may be configured to receive the or at least one acoustic human signal 10 for a defined period of time, whereby the control device 12 may be configured to process the at least one received acoustic human signal 10 so as to generate an average value of at least one acoustic parameter, e.g. loudness, of the at least one received acoustic human signal 10 for the respective period of time. Generating a respective average value may result in reduced consumption of processing capacity and may also lead to an enhanced user-experience due to a balanced control of the suppression level. The period of time is typically selected such that it is short enough that the control device 12 can react quickly enough when at least one acoustic human signal 10 is received.

The control device 12 or a noise suppressing device 14 (optional) assignable or assigned with the control device 12 may be configured to suppress received undesired noise signals present in the vehicle cabin 4. As such, undesired noise signals present in the vehicle cabin 4, particularly acoustic feedback generated by receiving the audio signal 3 which is outputtable or output in the vehicle cabin 4 via the audio outputting device 6 or noise generated from external noise sources, i.e. particularly noise sources outside the vehicle cabin 4, can be suppressed. The suppression of the undesired noise signals can be performed with dynamic or static suppression levels ranging from 100% (complete suppression) to 0% (no suppression). Suppressing respective undesired noise signals may require separating the received acoustic human signals 10 from the undesired noise signals or vice versa. In this regard, the above annotations regarding the determination and/or extraction of specific audio signal components from an audio signal 3 apply in analogous manner. The control device 12 or a noise suppressing device 14 (optional) assignable or assigned with the control device 12 may be embodied as or comprise one or more suitable hardware- and/or software-embodied filter devices (not shown) configured to suppress respective received undesired noise signals present in the vehicle cabin 4.

In optional embodiments, the following annotations with respect to the audio receiving device 9 apply:

The audio receiving device 9 may be built as or comprise at least one static audio receiving element 11 and/or at least one mobile audio receiving element 11. A respective mobile audio receiving element 11 may be embodied as a mobile, particularly hand-held, microphone. A mobile microphone can be embodied as a wired microphone or a wireless microphone.

At least one mobile audio receiving element 11 may be assignable or assigned to at least one person's seat in the vehicle cabin 4. Hence, the apparatus 2 may distinguish received acoustic human signals 10 based on the assignment of the respective audio receiving elements 11 to the respective person's seat in the vehicle cabin 4.

It is also conceivable case that the audio receiving device 9 comprises a plurality of mobile, particularly hand-held, audio receiving elements 11, whereby the receiving level of the respective mobile audio receiving elements 11 is individually adjustable or adjusted.

It is also conceivable that at least one audio receiving element provided with a mobile electronic device, e.g. smartphone, smartwatch, tablet, notebook, etc., of at least one person P located in the vehicle cabin 4 can be used as a mobile audio receiving element 11. In this case, a respective mobile electronic device needs to be connected with the apparatus 2 which can be achieved by a wired or wireless connection. As an example, Bluetooth-, NFC- or WIFI-connections could be established in the vehicle cabin 4.

Single, a plurality, or all devices, e.g. the acoustic parameter determination device 13 and/or the suppressing device 14, assignable or assigned to the control device 12 can be combined in one or more superordinate devices. The devices, e.g. the acoustic parameter determination device 13 and/or the suppressing device 14, assignable or assigned to the control device 12 may also be embodied as functional blocks of the control device 12.

The apparatus 2 allows for implementing a method for outputting and/or reproducing an audio signal 3 in a vehicle cabin 4. The method comprises the steps of:

outputting, particularly via at least one audio outputting device 6, an audio signal 3 comprising at least one audio signal component containing a human voice, particularly a singer's voice, and/or a musical instrument, in a vehicle cabin 4;

receiving, particularly via at least one audio receiving device 9, at least one acoustic human signal 10, particularly an acoustic human voice signal, of at least one person P located in the vehicle cabin 4 whilst outputting the audio signal 3 in the vehicle cabin 4;

controlling, particularly via at least one control device 12, operation of at least one audio processing device 8 configured to process the at least audio signal 3 comprising at least one audio signal component containing a human voice, particularly a singer's voice, and/or a musical instrument outputtable or output in the vehicle cabin 4, so as to suppress the or at least one audio signal component containing a human voice, particularly a singer's voice, and/or a musical instrument of the at least one audio signal 3 in a suppression mode based on the at least one received acoustic human signal 10.

The invention claimed is:

1. An apparatus for outputting an audio signal in a vehicle cabin, the apparatus comprising:
at least one audio outputting device configured to output an audio signal in a vehicle cabin;
at least one audio processing device configured to process the audio signal output by the at least one audio outputting device to split the audio signal into a plurality of audio signal components comprising at least one audio signal component containing a human voice and at least one audio signal component containing a musical instrument and suppress the at least one audio signal component containing the human voice and/or the at least one audio signal component containing the musical instrument in a suppression mode;
at least one audio receiving device configured to receive at least one acoustic human signal, particularly an acoustic human voice signal, of at least one person located in the or a vehicle cabin whilst the at least one audio outputting device outputs the audio signal in the vehicle cabin; and
at least one control device configured to control operation of the at least one audio processing device based on at least one acoustic human signal received by the at least one audio receiving device,
wherein the at least one control device is configured to process the at least one received acoustic human signal and, based on the at least one received acoustic human signal, determine if the at least one person located in the vehicle cabin is performing in accompaniment with the audio signal which is output in the vehicle cabin while the audio signal is output,
wherein the at least one control device is configured to determine a degree of matching between pitch- and/or rhythm-parameters of a received acoustic human signal and corresponding pitch- and/or rhythm-parameters of the at least one audio signal component containing the human voice and/or the at least one audio signal component containing the musical instrument which is output in the respective vehicle cabin, and
wherein, based on a determined degree of matching between the pitch- and/or rhythm-parameters of the received acoustic human signal and the corresponding pitch- and/or rhythm-parameters of the at least one audio signal component containing the human voice and/or the at least one audio signal component containing the musical instrument which is output in the respective vehicle cabin, the at least one control device is configured to generate at least one control signal enabling the suppression mode of the at least one audio processing device and/or to generate a control signal disabling the suppression mode of the at least one audio processing device and/or to generate a control signal modifying the suppression mode of the at least one audio processing device.

2. The apparatus according to claim 1, wherein the at least one control device is configured to process the at least one received acoustic human signal so as to determine if the at least one person located in the vehicle cabin articulates an acoustic suppression mode enabling command, or an acoustic suppression mode disabling command, or an acoustic suppression mode modifying command.

3. The apparatus according to claim 1, wherein the at least one control device is configured to process the at least one received acoustic human signal so as to determine at least one acoustic parameter of the at least one received acoustic human signal,
whereby
the at least one control device is configured to control operation of the at least one audio processing device based on the at least one determined acoustic parameter of the at least one received acoustic human signal.

4. The apparatus according to claim 1, wherein the at least one control device is configured to statically or dynamically control operation of the at least one audio processing device.

5. The apparatus according to claim 1, wherein the at least one control device is configured to process the at least one received acoustic human signal so as to determine at least one dynamic acoustic parameter of the at least one received acoustic human signal, whereby
the at least one control device is configured to dynamically control operation of the at least one audio processing device based on the at least one determined dynamic acoustic parameter of the at least one received acoustic human signal.

6. The apparatus according to claim 5, wherein the at least one control device is configured to dynamically control operation of the at least one audio processing device based on the at least one determined dynamic acoustic parameter of the at least one received acoustic human signal by dynamically increasing or decreasing a suppression level applicable to the at least one audio signal component containing the human voice and/or the at least one audio signal component containing the musical instrument which is to be suppressed, particularly in accordance with a dynamically increasing or decreasing acoustic parameter level of the at least one received acoustic human signal.

7. The apparatus according to claim 5, wherein the at least one dynamic acoustic parameter of the at least one received acoustic human signal is loudness and/or pitch and/or rhythm.

8. The apparatus according to claim 1, wherein the at least one audio receiving device is configured to receive the at least one acoustic human signal for a defined period of time, whereby
the at least one control device is configured to process the at least one received acoustic human signal so as to generate an average value of at least one acoustic parameter of the at least one received acoustic human signal for the respective period of time.

9. The apparatus according to claim 1, wherein the at least one control device is configured to suppress received undesired noise signals present in the vehicle cabin.

10. The apparatus according to claim 1, wherein the at least one audio receiving device comprises at least one audio receiving element.

11. A control device for an apparatus for outputting at least one audio signal in a vehicle cabin, the control device being configured to control operation of an audio processing device configured to process an audio signal outputtable in a vehicle cabin by at least one audio outputting device to split the audio signal into a plurality of audio signal components comprising at least one audio signal component containing a human voice and at least one audio signal component containing a musical instrument to suppress the at least one audio signal component containing the human voice and/or the at least one audio signal component containing the musical instrument in a suppression mode based on at least one acoustic human signal received by at least one audio receiving device,
wherein the control device is further configured to process the at least one received acoustic human signal and, based on the at least one received acoustic human signal, determine if the at least one person located in the vehicle cabin is performing in accompaniment with the audio signal which is output in the vehicle cabin while the audio signal is output,
wherein the control device is configured to determine a degree of matching between pitch- and/or rhythm-parameters of a received acoustic human signal and corresponding pitch- and/or rhythm-parameters of the at least one audio signal component containing the human voice and/or the at least one audio signal component containing the musical instrument which is output in the respective vehicle cabin, and
wherein, based on a determined degree of matching between the pitch- and/or rhythm-parameters of the received acoustic human signal and the corresponding pitch- and/or rhythm-parameters of the at least one audio signal component containing the human voice and/or the at least one audio signal component containing the musical instrument which is output in the respective vehicle cabin, the control device is configured to generate at least one control signal enabling the suppression mode of the at least one audio processing device and/or to generate a control signal disabling the suppression mode of the at least one audio processing device and/or to generate a control signal modifying the suppression mode of the at least one audio processing device.

12. A vehicle comprising a vehicle cabin and an apparatus according to claim 1.

13. A method for outputting an audio signal in a vehicle cabin, the method comprising the steps of:
   outputting, via at least one audio outputting device, an audio signal in a vehicle cabin;
   receiving, via at least one audio receiving device, at least one acoustic human signal of at least one person located in the vehicle cabin whilst outputting the audio signal in the vehicle cabin;
   controlling, via at least one control device, operation of at least one audio processing device configured to process the audio signal to split the audio signal into a plurality of audio signal components comprising at least one audio signal component containing a human voice and at least one audio signal component containing a musical instrument so as to suppress the at least one audio signal component containing the human voice and/or the at least one audio component containing the musical instrument in a suppression mode based on the at least one received acoustic human signal,
   wherein the at least one control device is configured to process the at least one received acoustic human signal and, based on the at least one received acoustic human signal, determine if the at least one person located in the vehicle cabin is performing in accompaniment with the audio signal which is output in the vehicle cabin while the audio signal is output,
   wherein the at least one control device is configured to determine a degree of matching between pitch- and/or rhythm-parameters of a received acoustic human signal and corresponding pitch- and/or rhythm-parameters of the at least one audio signal component containing the human voice and/or the at least one audio signal component containing the musical instrument which is output in the respective vehicle cabin, and
   wherein, based on a determined degree of matching between the pitch- and/or rhythm-parameters of the received acoustic human signal and the corresponding pitch- and/or rhythm-parameters of the at least one audio signal component containing the human voice and/or the at least one audio signal component containing the musical instrument which is output in the respective vehicle cabin, the at least one control device is configured to generate at least one control signal enabling the suppression mode of the at least one audio processing device and/or to generate a control signal disabling the suppression mode of the at least one audio processing device and/or to generate a control signal modifying the suppression mode of the at least one audio processing device.

14. The apparatus according to claim 1, wherein the at least on control device determines if the at least one person located in the vehicle is performing in accompaniment with the audio signal component containing the human voice and/or the audio signal component containing the musical instrument based on:
   determining one or more parameters of the at least one received acoustic human signal; and
   comparing the one or more parameters of the at least one received acoustic human signal with reference parameters.

15. The apparatus according to claim 14, wherein the one or more parameters comprise acoustic parameters of the at least one received acoustic human signal.

16. The apparatus according to claim 15, wherein the acoustic parameters comprise a pitch of the at least one received acoustic human signal, a rhythm of the at least one received acoustic human signal, or both the pitch and the rhythm of the at least one received acoustic human signal.

17. The apparatus according to claim 1, wherein the splitting of the audio signal comprises analyzing the audio signal with regard to the respective audio signal component which is to be split from other audio signal components not to be suppressed.

18. The control device according to claim 11, wherein the splitting of the audio signal comprises analyzing the audio signal with regard to the respective audio signal component which is to be split from other audio signal components not to be suppressed.

19. The method according to claim 13, wherein the splitting of the audio signal comprises analyzing the audio signal with regard to the respective audio signal component which is to be split from other audio signal components not to be suppressed.

* * * * *